(12) United States Patent
Lin

(10) Patent No.: US 9,763,088 B2
(45) Date of Patent: Sep. 12, 2017

(54) MESH NETWORK WITH PERSONAL PRE-SHARED KEYS

(71) Applicant: Ruckus Wireless, Inc., Sunnyvale, CA (US)

(72) Inventor: Ta-Chien Lin, San Ramon, CA (US)

( * ) Notice: Subject to any disclaimer, the term of this patent is extended or adjusted under 35 U.S.C. 154(b) by 0 days.

(21) Appl. No.: 14/588,006

(22) Filed: Dec. 31, 2014

(65) Prior Publication Data

US 2016/0192186 A1    Jun. 30, 2016

(51) Int. Cl.
| | |
|---|---|
| H04L 29/06 | (2006.01) |
| H04W 12/04 | (2009.01) |
| H04W 12/02 | (2009.01) |
| H04W 84/12 | (2009.01) |

(52) U.S. Cl.
CPC ........... *H04W 12/04* (2013.01); *H04L 63/061* (2013.01); *H04L 63/068* (2013.01); *H04W 12/02* (2013.01); *H04W 84/12* (2013.01)

(58) Field of Classification Search
CPC .. H04L 63/0435; H04L 63/061; H04L 63/068
See application file for complete search history.

(56) References Cited

U.S. PATENT DOCUMENTS

| | | | | |
|---|---|---|---|---|
| 9,226,146 | B2* | 12/2015 | Ranade | H04L 63/062 |
| 2006/0205388 | A1* | 9/2006 | Semple | H04L 63/0853 |
| | | | | 455/411 |
| 2008/0232382 | A1* | 9/2008 | Iwama | H04L 12/4641 |
| | | | | 370/401 |
| 2010/0131762 | A1* | 5/2010 | Wu | H04L 63/06 |
| | | | | 713/170 |
| 2010/0269153 | A1* | 10/2010 | Kato | G06F 21/31 |
| | | | | 726/3 |
| 2011/0118030 | A1* | 5/2011 | Walley | G06F 21/32 |
| | | | | 463/37 |
| 2012/0030466 | A1* | 2/2012 | Yamaguchi | H04L 9/0841 |
| | | | | 713/168 |
| 2013/0269008 | A1* | 10/2013 | Sheu | H04W 12/04 |
| | | | | 726/6 |
| 2014/0073289 | A1* | 3/2014 | Velasco | H04W 12/04 |
| | | | | 455/411 |
| 2014/0075025 | A1* | 3/2014 | Stanforth | H04W 48/14 |
| | | | | 709/225 |

(Continued)

*Primary Examiner* — Ali Shayanfar
(74) *Attorney, Agent, or Firm* — Steven Stupp

(57) ABSTRACT

A mesh network with a network-wide pre-shared key (PSK) that can be updated is described. The PSK can be used to establish secure communication between arbitrary electronic devices in the mesh network. In order to prevent electronic devices from being inadvertently 'stranded,' i.e., unable to securely communicate with other electronic devices in the mesh network when the PSK is updated, pairs of electronic devices in the mesh network establish personal PSKs (PPSKs). In particular, after securely associating with each other, a given pair of electronic devices may have used the current PSK to authenticate and encrypt their communication. Then, the given pair of electronic devices may define a PPSK, e.g., by exchanging one or more random numbers. If a subsequent attempt at establishing secure or encrypted communication between the given pair of electronic devices fails, these electronic devices may use the PPSK as a backup to establish the encrypted communication.

18 Claims, 6 Drawing Sheets

(56) References Cited

U.S. PATENT DOCUMENTS

| | | | |
|---|---|---|---|
| 2014/0206346 A1* | 7/2014 | Kiukkonen | H04W 52/0229 455/426.1 |
| 2014/0334464 A1* | 11/2014 | Qi | H04W 4/08 370/338 |
| 2015/0230280 A1* | 8/2015 | Dees | H04W 76/023 455/39 |
| 2015/0288517 A1* | 10/2015 | Evans | H04L 9/0883 713/168 |
| 2015/0318998 A1* | 11/2015 | Erlikhman | H04L 9/3271 713/171 |
| 2016/0021066 A1* | 1/2016 | Parvathaneni | H04W 12/04 713/171 |

* cited by examiner

MESH NETWORK WITH PERSONAL PRE-SHARED KEYS

BACKGROUND

Field

The described embodiments relate to techniques for establishing encrypted communication in a wireless mesh network. In particular, the described embodiments relate to techniques for defining a personal pre-shared key between pairs of electronic devices in a wireless mesh network.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

One approach to wireless communication is to use a wireless mesh network (which is henceforth referred to as a 'mesh network'). In a mesh network, multiple electronic devices (which are sometimes referred to as 'nodes') are organized in a mesh topology in which electronic devices communicate with each other via zero or more intermediate electronic devices or nodes. Typically, an electronic device in a mesh network communicates with its nearest neighbors. In a mesh network, a communication between two electronic devices via an intermediate electronic device or node is sometimes referred to as 'one-hop' communication, while the communication between the two electronic devices via two intermediate electronic devices or nodes is sometimes referred to as a 'two-hop' communication. Similarly, the communication between the two electronic devices via N intermediate electronic devices or nodes is sometimes referred to as an 'N-hop' communication.

The communication between two electronic devices in a mesh network (and, more generally, an arbitrary wireless network) can be secure. For example, a controller may distribute a pre-shared key (PSK) to the electronic devices in a mesh network. Subsequently, when two of the electronic devices in the mesh network securely associate with each other, the PSK may be used to authenticate the and to establish a secure connection between the two electronic devices.

However, it can be difficult to update the PSK in a mesh network. In particular, if an electronic device in the mesh network does not receive the updated PSK before the mesh network switches over to using the updated PSK (e.g., because of: a power failure, wireless interference, a hardware failure, rebooting of the electronic device, a hacker attack, etc.), then this electronic device may not be able to subsequently communicate with the other electronic devices in the mesh network.

SUMMARY

The described embodiments relate to an electronic device that establishes encrypted communication. This electronic device includes: an antenna, and an interface circuit that communicate with other electronic devices, where a path to a root electronic device in the other electronic devices, which is coupled to a network, contains at least one wireless connection that passes information from a client device to the network. During provisioning, the electronic device receives a pre-shared key (PSK) from a controller. Then, during operation, the electronic device establishes encrypted communication with a first electronic device in the other electronic devices using the PSK. Next, the electronic device exchanges a first personal pre-shared key (PPSK) with the first electronic device, where the first PPSK is associated with or corresponds to the electronic device and the first electronic device. When a subsequent attempt to establish encrypted communication with the first electronic device using the PSK fails, the electronic device establishes encrypted communication with the first electronic device using the first PPSK.

For example, the encrypted communication may include Wi-Fi Protected Access.

Moreover, the first PPSK can include a random number and/or the first PPSK may be valid during a time interval. Furthermore, the electronic device may provide the first PPSK to the first electronic device. Alternatively, the first PPSK may be a secret that is only known to the electronic device and the first electronic device.

In some embodiments, the electronic device receives at least a portion of the first PPSK from the first electronic device. Alternatively, the electronic device may provide at least a portion of the first PPSK to a second electronic device in the other electronic devices.

Additionally, the electronic device may: establish encrypted communication with a second electronic device in the other electronic devices using the PSK; and exchange a second PPSK with the second electronic device, where the second PPSK is associated with or corresponds to the electronic device and the second electronic device. When a subsequent attempt to establish encrypted communication with the second electronic device using the PSK fails, the electronic device may establish encrypted communication with the second electronic device using the second PPSK.

In some embodiments, the electronic device attempts to re-establish encrypted communication with an upstream electronic device in the other electronic devices using the PSK or an updated PSK received from the controller or via out-of-band communication (such as from a mobile application provisioning an access point). When the attempt to re-establish the encrypted communication with the upstream electronic device fails, the electronic device re-establishes encrypted communication with the upstream electronic device in the other electronic devices using a predefined PPSK between the electronic device and the upstream electronic device. This attempt to re-establish the encrypted communication with the upstream electronic device may occur after the electronic device wakes up.

Note that the electronic device may include: a processor; and a memory, coupled to the processor, which stores a program module that is executed by the processor. This program module may include instructions for at least some of the operations performed by the electronic device (i.e., at least some of the operations performed by the electronic device may be performed using software).

Another embodiment provides a computer-program product for use with the electronic device. This computer-program product includes instructions for at least some of the operations performed by the electronic device.

Another embodiment provides a method. This method includes at least some of the operations performed by the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

A mesh network with a network-wide pre-shared key (PSK) that can be updated is described. The PSK can be used to establish secure communication between arbitrary electronic devices in the mesh network. In order to prevent electronic devices from being inadvertently 'stranded,' i.e., unable to securely communicate with other electronic devices in the mesh network when the PSK is updated, pairs of electronic devices in the mesh network establish personal PSKs (PPSKs). In particular, after securely associating with each other, a given pair of electronic devices may have used the current PSK to authenticate and encrypt their communication. Then, the given pair of electronic devices may define a PPSK, e.g., by exchanging one or more random numbers. If a subsequent attempt at establishing secure or encrypted communication between the given pair of electronic devices fails, these electronic devices may use the PPSK as a backup to establish the encrypted communication.

By defining the PPSK between the given pair of electronic devices, this communication technique may allow the global, centrally distributed PSK to be updated while maintaining the reliability of the mesh network (and, more generally, an arbitrary wireless network). This capability may improve the security of the mesh network, while ensuring that the electronic devices have a backup so they are not inadvertently stranded. In turn, this may reduce the cost of operating the mesh network. For example, the communication technique may eliminate a site visit by a network operator to investigate and attempt corrective actions when electronic devices are stranded. In addition, the communication technique may increase the up time of the mesh network.

In the discussion that follows, the electronic devices include radios that communicate frames that include payloads (e.g., packets) in accordance with a communication protocol, such as an Institute of Electrical and Electronics Engineers (IEEE) 802.11 standard (which is sometimes referred to as 'Wi-Fi®' from the Wi-Fi Alliance of Austin, Tex.), Bluetooth (from the Bluetooth Special Interest Group of Kirkland, Washington), and/or another type of wireless interface (such as another wireless-local-area-network interface). In the discussion that follows, Wi-Fi is used as an illustrative example. However, a wide variety of communication protocols may be used.

Figure 1:
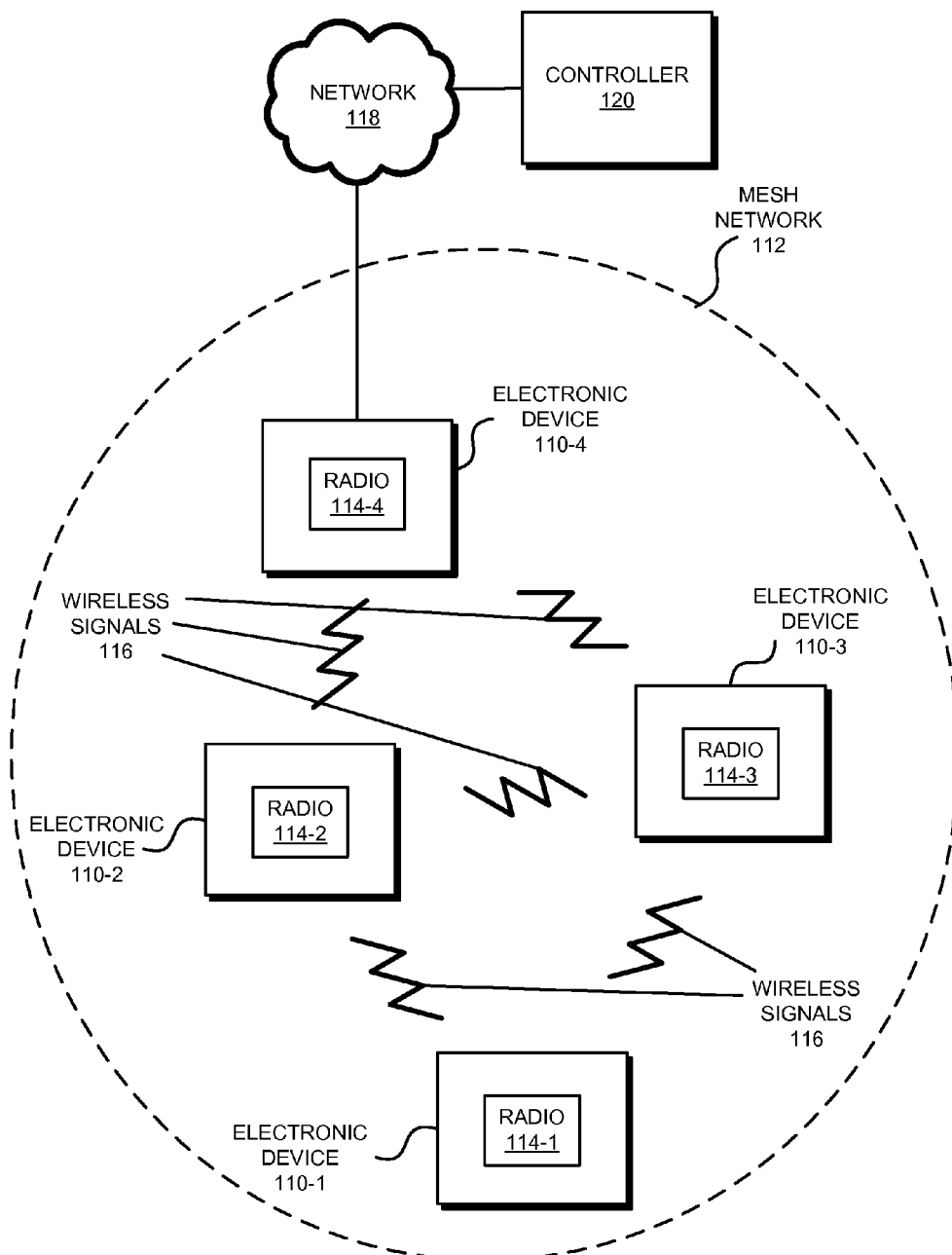
FIG. 1 is a block diagram illustrating electronic devices wirelessly communicating in accordance with an embodiment of the present disclosure.

Communication among electronic devices is shown in FIG. 1, which presents a block diagram illustrating electronic devices 110 (such as access points) wirelessly communicating in a mesh network 112 according to some embodiments. In particular, these electronic devices may wirelessly communicate while: transmitting advertising frames on wireless channels, detecting one another by scanning wireless channels, establishing connections (for example, by transmitting association requests), and/or transmitting and receiving frames that include packets (which may include the association requests and/or additional information as payloads). Note that a 'mesh network' may have a network topology in which each electronic device or node (which is sometimes called a 'mesh node') relays data for the mesh network, and the nodes cooperate in the distribution of data in the mesh network. Moreover, in a 'mesh network,' a path to a root electronic device, which is coupled to another network (such as the Internet), contains at least one wireless connection that passes information from a client device to the other network.

Figure 6:
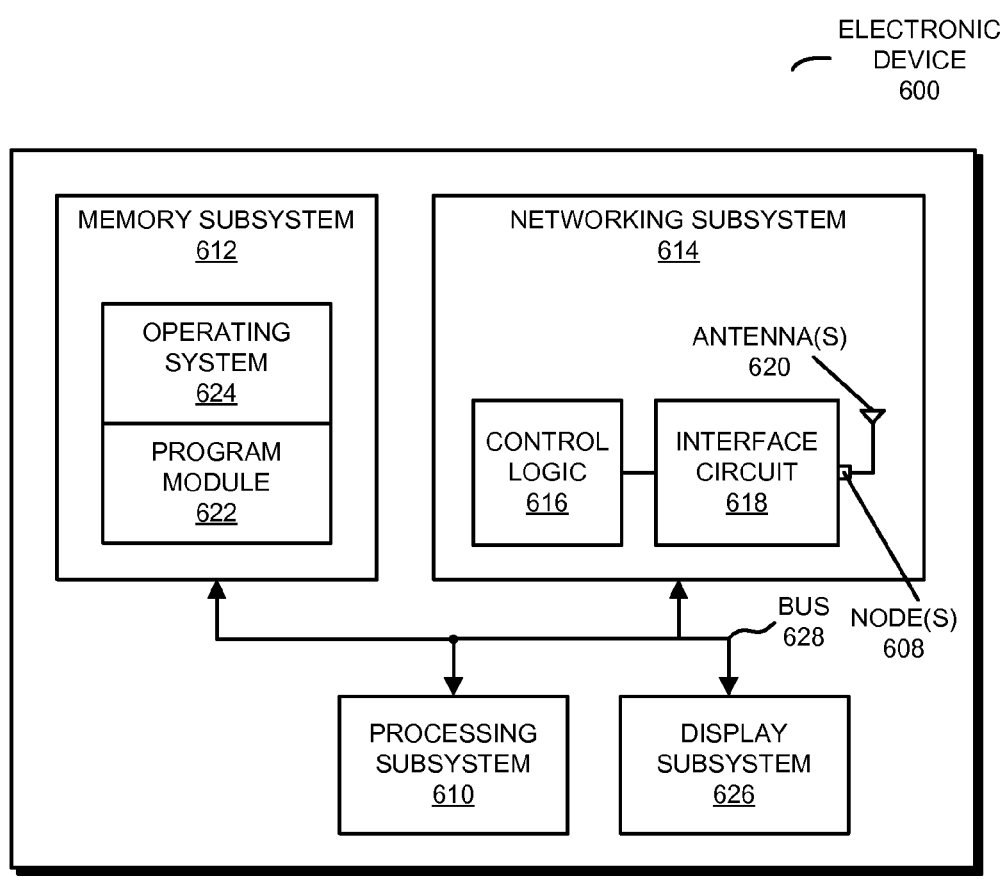
FIG. 6 is a block diagram illustrating one of the electronic devices of FIG. 1 in accordance with an embodiment of the present disclosure.

As described further below with reference to FIG. 6, electronic devices 110 may include subsystems, such as a networking subsystem, a memory subsystem and a processor subsystem. In addition, electronic devices 110 may include radios 114 in the networking subsystems. More generally, electronic devices 110 can include (or can be included within) any electronic devices with the networking subsystems that enable electronic devices 110 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security, Wi-Fi Protected Access), transmit and receive frames that include packets via the connection, etc.

Moreover, as can be seen in FIG. 1, wireless signals 116 (represented by jagged lines) are transmitted by radios 114 in electronic devices 110. For example, radio 114-1 in electronic device 110-1 may transmit information (such as frames that include packets) using wireless signals. These wireless signals are received by radios 114 in one or more other electronic devices (such as electronic devices 110-2 and 110-3). This may allow electronic device 110-1 to communicate information to electronic devices 110-2 and/or 110-3. Furthermore, electronic devices 110-2 and/or 110-3 may wirelessly transmit frames that include packets to electronic device 110-4, which is a root device in mesh network 112. This root device may have a direct connection to a wired network 118, such as the Internet and/or an intranet. Note that electronic device 110-1 may access network 118 via at least one of electronic devices 110-2 and 110-3, and electronic device 110-4. Thus, electronic device 110-1 may access network 118 via one hop (such as via electronic device 110-2 or electronic device 110-3, which then communicates with electronic device 110-4) or two hops (such as via electronic device 110-2, which communicates with electronic device 110-3, which in turn communicates with electronic device 110-4) in mesh network 112. In FIG. 1, while electronic devices 110-2 and 110-3 have the 'option' to communicate with each other (because they are within communication or wireless range of each other) in a typical IEEE 802.11 network, the network design may involve operating elements that prevent a network loop condition. Thus, while it is ok to 'connect', from the perspective or network packet forwarding, FIG. 1 should not be construed as to imply that a network loop condition exists, if this condition is detrimental to the network.

Note that the communication among electronic devices 110 (such as between at least any two of electronic devices 110) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). In some embodiments, the communication among electronic devices 110 (such as between at least any two of electronic devices 110) is characterized by an error-rate model, which compares the error rate during communication at the data rate.

In order to enable secure communication among electronic devices 110 in mesh network 112, controller 120 may distribute a pre-shared key or PSK (and, more generally, a credential) to electronic devices 110 via network 118 and mesh network 112. For example, the PSK may include an asymmetric encryption key, a symmetric encryption key, a hashing function, etc. This PSK may be used by an arbitrary pair of electronic devices 110 to authenticate each other, to encrypt their communication and to ensure data privacy. In some embodiments, the PSK is used to authenticate and then is used in a technique (such as a Diffe-Hellman key exchange technique) to derive other keys, including the actual session key to encrypt the connection. Thus, in some embodiments the PSK is not used to directly encrypt the communication. Note that controller 120 may distribute the PSK via a wired or a wireless connection with electronic devices 110. Because the PSK is global, i.e., is used by electronic devices 110 throughout mesh network 112, it may be advantageous to update the PSK (which is sometimes referred to as 'rekeying') as needed (e.g., periodically, after a time interval, etc.). In particular, updating the PSK may improve security in mesh network 112. However, it can be difficult to ensure that all of electronic devices 110 receive an updated PSK before mesh network 112 switches over to using the updated PSK. For example, if there is a power failure, wireless interference, a hardware failure, a reboot, a hacker attack, etc., at least one of electronic devices 110 may not receive the updated PSK. Consequently, this electronic device may not be able to subsequently communicate with the other electronic devices 110 when it is powered up, wakes up, or when communication with the rest of mesh network 112 is restored.

To address this problem, pairs of electronic devices 110 may define personal pre-shared keys or PPSKs (and, more generally, private credentials) by leveraging the trust provided by the PSK. As described further below with reference to FIGS. 2 and 3, after receiving the PSK from controller 120 and establishing encrypted communication between a given pair of electronic devices 110 (e.g., using a four-way handshaking procedure in Wi-Fi Protected Access), this given pair of electronic devices 110 may define a unique PPSK for use by the given pair of electronic devices. For example, the PPSK for the given pair of electronic devices 110 may be one or more random numbers. (More generally, the PPSK is something that is known and agreed upon between pairs of electronic devices 110.) Note that this PPSK may be associated with or may be specific to the given pair of electronic devices. Therefore, each pair of electronic devices 110 that establishes secure or encrypted communication using the PSK may subsequently define unique PPSKs as a backup for subsequent use when an attempt to establish encrypted communication between the pairs of electronic devices 110 using the PSK fails. (However, in some embodiments, the PSK does not have to be used first and fail before the PPSK is used.) Note that, for the given pair of electronic devices 110, the associated PPSK may be provided by the authenticator (e.g., the upstream electronic device that acts as the access point and that initiates the secure communication) or the supplicant (e.g., the downstream counterparty electronic device that acts as the client). Moreover, the PPSK for the given pair of electronic devices 110 may be a secret that is only known to the given pair of electronic devices 110. Alternatively, this PPSK may be shared with one or more of the remaining electronic devices 110 in mesh network 112. In some embodiments, the PPSK for the given pair of electronic devices 110 is valid during a time interval, such as 3 months.

Figure 4:
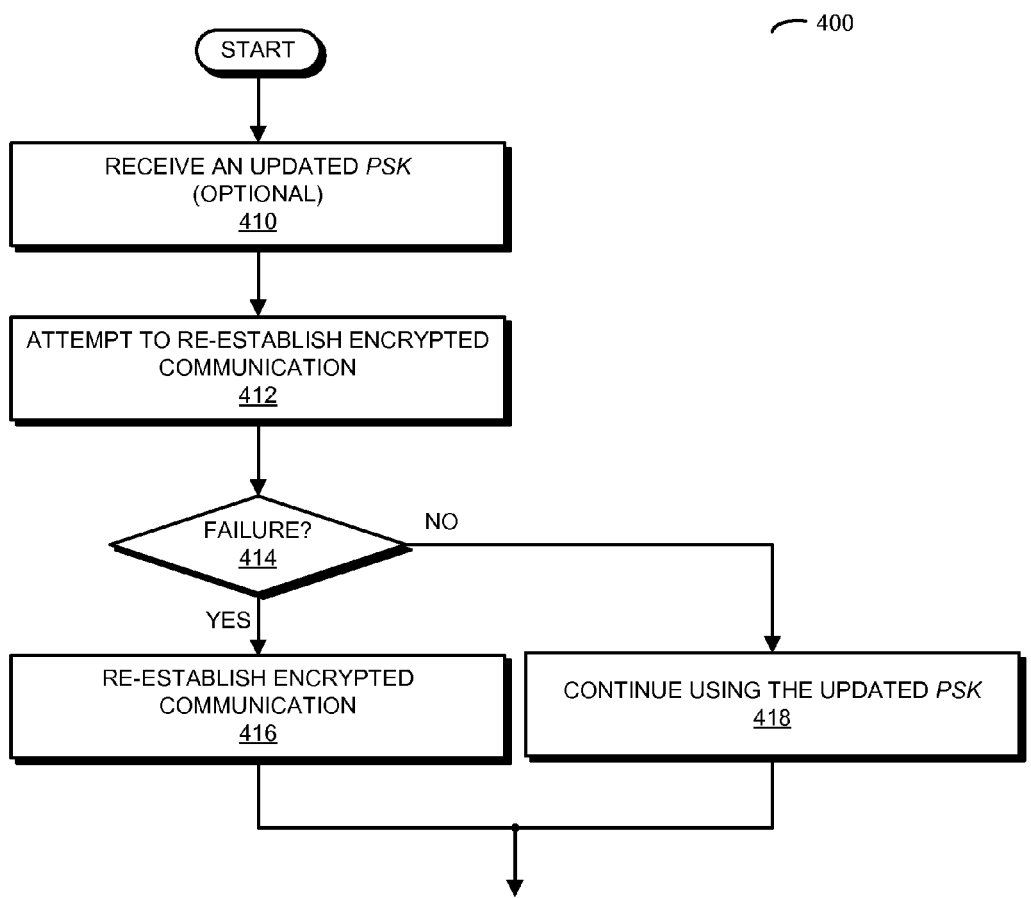
FIG. 4 is a flow diagram illustrating a method for re-establishing encrypted communication between a pair of the electronic devices in FIG. 1 in accordance with an embodiment of the present disclosure.

As described further below with reference to FIGS. 4 and 5, one of electronic devices 110 may attempt to re-establish encrypted communication with another of electronic devices 110 (such as an upstream electronic device in mesh network 112) using the PSK or an updated PSK that was received from controller 120. For example, this attempt to re-establish the encrypted communication with the other electronic device may occur after the electronic device wakes up. If the attempt to re-establish the encrypted communication with the other electronic device fails, the electronic device may re-establish encrypted communication with the other electronic device in mesh network 112 using a predefined PPSK between the electronic device and the other electronic device. More generally, the electronic device may have a set of PPSKs with multiple other electronic devices in the mesh network, and the electronic device may selectively use these PPSKs as a list of keys to try (with their corresponding counterparty electronic devices in the multiple other electronic devices) when the PSK no longer works until the electronic device is able to access the mesh network.

In an exemplary embodiment, electronic device 114-1 (which is the furthest downstream node) conveys its preferred PPSK to electronic device 114-2. Then, electronic device 114-2 acts on behalf of electronic device 114-1 and shares this knowledge with electronic devices 114-3 and 114-4. Consequently, if communication with electronic device 114-2 breaks down in the middle of a PSK update, electronic device 114-1 only has to reach electronic device 114-3. However, note that electronic device 114-1 may have never previously established a secure association directly with electronic device 114-3, and electronic device 114-1 is not in possession of an updated PSK. Instead, electronic device 114-1 can use its PPSK (which was exchanged with electronic device 114-2) to establish a connection with electronic device 114-3, which may allow electronic device 114-1 to receive the updated PSK.

In the described embodiments, processing a frame that includes packets in electronic devices 110 includes: receiving the wireless signals with the frame; decoding/extracting the frame from the received wireless signals to acquire the frame; and processing the frame to determine information contained in the payload of the frame (such as the packet, which may include feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving frames that include packets.

Figure 2:
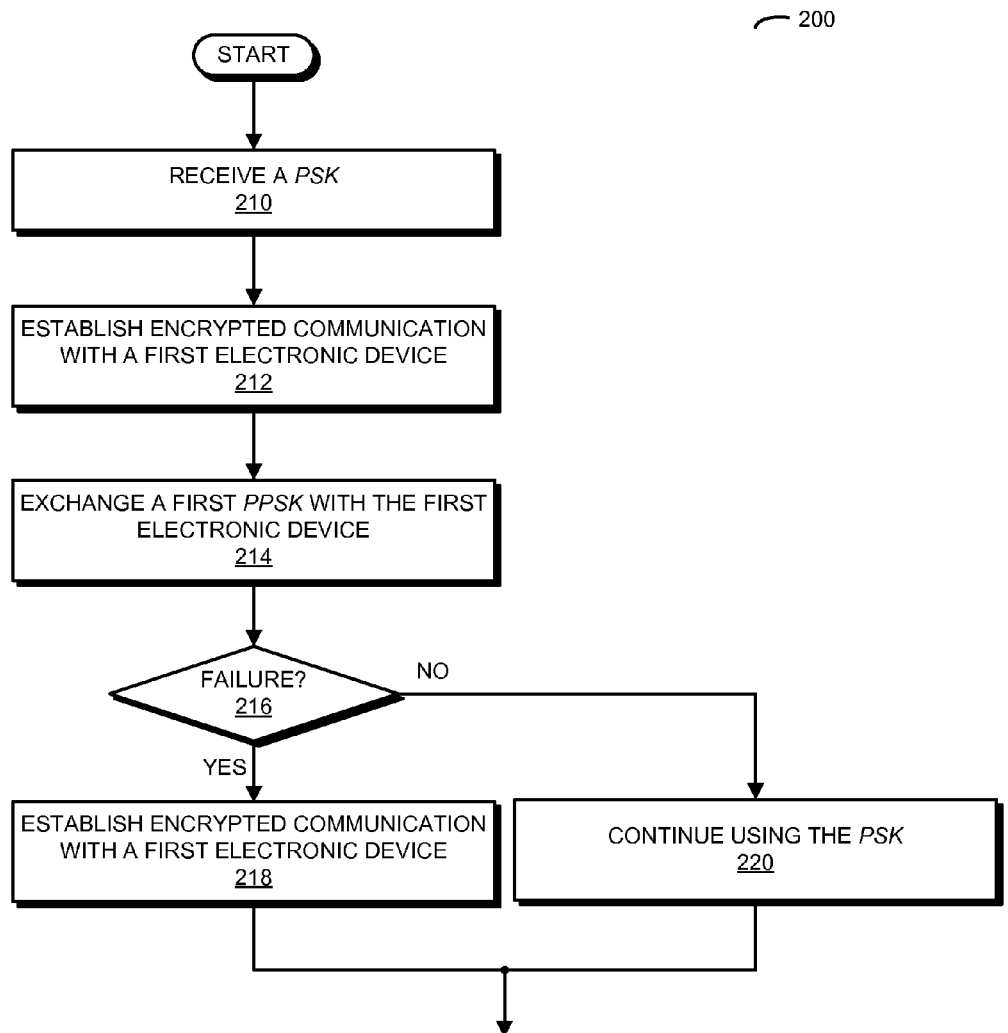
FIG. 2 is a flow diagram illustrating a method for establishing a personal pre-shared key (PPSK) between a pair of the electronic devices in FIG. 1 in accordance with an embodiment of the present disclosure.

FIG. 2 presents embodiments of a flow diagram illustrating method 200 for exchanging a PPSK that may be performed by an electronic device, such as one of electronic devices 110 in FIG. 1 (e.g., electronic device 110-1), according to some embodiments. During operation, the electronic device receives a pre-shared key (PSK) (operation 210) from a controller. Then, the electronic device establishes encrypted communication with a first electronic device (operation 212) in the mesh network using the PSK. For example, establishing the encrypted communication may involve a four-way handshaking procedure in Wi-Fi Protected Access in which there are requests and responses between a supplicant or station and an authenticator or access point.

Next, the electronic device exchanges a first PPSK with the first electronic device (operation 214), where the first PPSK is associated with or corresponds to the electronic device and the first electronic device. For example, the electronic device may provide a first random number as at least a portion of the first PPSK to the first electronic device. Alternatively or additionally, the first electronic device may provide the second random number as at least a portion of the first PPSK to the electronic device. However, in some embodiments the first electronic device may not support secure communication via the first PPSK, in which case the PSK is used to establish secure communication. At this point, note that the electronic device and the first electronic device have a good secure connection for communication, so exchanging the first PPSK may just be in preparation for future use. Therefore, the first PPSK may not need to be actively used right away.

When a subsequent attempt to establish encrypted communication with the first electronic device using the PSK fails (operation 216), the electronic device establishes encrypted communication with the first electronic device (operation 218) using the first PPSK. Otherwise (operation 216), the electronic device continues using the PSK (operation 220). In general, note that if there is no failure, either the PSK or the first PPSK may be used to establish secure communication.

Note that the electronic device may also establish different PPSKs with other electronic devices in the mesh network. Thus, after establishing encrypted communication with a second electronic device in the mesh network using the PSK, the electronic device may exchange a second PPSK with the second electronic device, where the second PPSK is associated with or corresponds to the electronic device and the second electronic device.

In this way, the electronic device (for example, an interface circuit, a driver and/or software executed in an environment of the electronic device) may facilitate communication with one or more other electronic devices in the mesh network. In particular, the electronic device may define the PPSK with another electronic device so that a backup is available in the event that an attempt to establish encrypted communication between the electronic device and the other electronic device using the PSK fails. This capability may reduce the operating cost and may improve security and reliability in the mesh network.

In some embodiments of method 200, there may be additional or fewer operations. Moreover, the order of the operations may be changed, and/or two or more operations may be combined into a single operation.

In some embodiments, when a client device (such as electronic device 110-1 in FIG. 1) is establishing and a secure association with the mesh network, it needs a key, such as the network PSK. However, when the client device is in possession of more than one key, it has the option to use either the network PSK or one of one or more PPSK(s) in any order. The order does not need to be fixed. The client device may try the network PSK first, and may fall back to a PPSK if this attempt fails.

Note that the PPSK may need to be known between a client device (such as electronic device 110-1 in FIG. 1) and an upstream device (such as one of electronic devices 110-2 and 110-3), which are within radio range of electronic device 110-1. How this PPSK is agreed upon, and the formula for its creation can be varied in different embodiments. Thus, either or both sides of secure connection may determine the PPSK.

This communication technique allows the client device, which is trying to connect to a mesh network, to use an additional key (the PPSK), which can be administered locally, privately and/or 'automatically' between the pair of electronic devices, to achieve the objective of robustness. In principle, this robustness may be enhanced if electronic devices 110-2 and 110-3 in FIG. 1 can share what they know about electronic device 110-1, and to also share this information with electronic device 110-4 (even if electronic device 110-4 is within range of electronic device 110-1). A variety of techniques can be used to facilitate the distribution of the PPSK within at least a portion of the mesh network.

Figure 3:
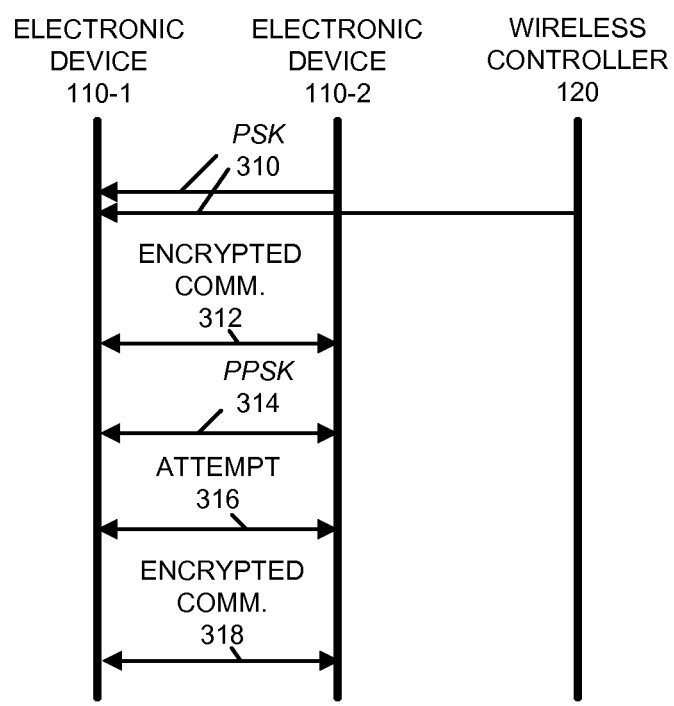
FIG. 3 is a drawing illustrating communication among the electronic devices in FIG. 1 in accordance with an embodiment of the present disclosure.

Embodiments of the communication technique are further illustrated in FIG. 3, which presents a drawing illustrating communication between electronic device 110-1 and electronic device 110-2 (FIG. 1) according to some embodiments. In particular, during the communication technique electronic devices 110-1 and 110-2 may receive PSK 310 from controller 120. Then, electronic device 110-1 establishes encrypted communication 312 with electronic device 110-2 using PSK 310.

Next, electronic device 110-1 exchanges a PPSK 314 with electronic device 110-2. For example, electronic device 110-1 may provide a first random number as at least a portion of PPSK 314 to electronic device 110-2. Alternatively or additionally, electronic device 110-2 may provide a second random number as at least a portion of PPSK 314 to electronic device 110-1.

In some embodiments, PPSK 314 is based on stored potential PPSKs in electronic devices 110. In particular, an authenticator in a given pair of electronic devices 110 provides the first random number (which may be a nonce random number) to the supplicant in a given pair of electronic devices 110. Then, the supplicant provides the second random number (which may also be a nonce random number) to the authenticator along with first text (which may include alphanumeric characters). The authenticator may compare the first text to a stored first 'secret' text for the supplicant (which may be based on or provided by the controller when the electronic devices are provisioned or when the electronic devices join the mesh network). Note that the stored first text may be a function (such as a secure hash) of the PSK and the first random number, which may specify one of a set of stored possible PPSKs in the authenticator. If there is a match, the authenticator may provide second text to the supplicant, which compares the second text to a stored second 'secret' text for the authenticator. Once again, note that the stored second text may be a function (such as a secure hash) of the PSK and the second random number, which may specify one of a set of stored possible PPSKs in the supplicant. If there is a match, the supplicant may provide an acknowledgment to the authenticator that PPSK 314 has been defined.

When a subsequent attempt 316 to establish encrypted communication between electronic devices 110-1 and 110-2 using PSK 310 fails, 318, electronic device 110-1 establishes encrypted communication 318 with electronic device 110-2 using PPSK 314. Note that some of the operations in FIG. 3 (such as establishing encrypted communication 318) may involve multiple operations, such as handshaking between electronic devices 110-1 and 110-2.

As described previously, the PPSK may be used to recover or re-establish secure encrypted communication between a pair of electronic devices in the mesh network. In particular, FIG. 4 presents embodiments of a flow diagram illustrating method 400 for re-establishing encrypted communication that may be performed by an electronic device, such as one of electronic devices 110 in FIG. 1 (e.g., electronic device 110-1), according to some embodiments. During operation, the electronic device optionally receives an updated PSK (operation 410) from a controller. Then, the electronic device may attempt to re-establish encrypted communication (operation 412) with an upstream electronic device in the mesh network using a PSK or the updated PSK. (However, upon receiving an updated PSK, it may not be necessary for the electronic device to trigger a connection re-establishment.)

When the attempt to re-establish the encrypted communication with the upstream electronic device fails (operation 414), the electronic device re-establishes encrypted communication (operation 416) with the upstream electronic device in the mesh network using a predefined PPSK between the electronic device and the upstream electronic device. Otherwise (operation 414), the electronic device continues to use the updated PSK (operation 418).

In some embodiments of method 400, there may be additional or fewer operations. Moreover, the order of the operations may be changed, and/or two or more operations may be combined into a single operation.

Figure 5:
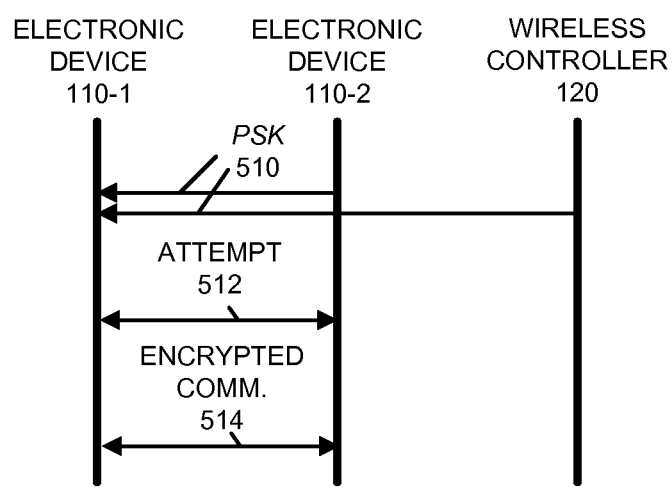
FIG. 5 is a drawing illustrating communication among the electronic devices in FIG. 1 in accordance with an embodiment of the present disclosure.

Embodiments of the communication technique are further illustrated in FIG. 5, which presents a drawing illustrating communication between electronic device 110-1 and electronic device 110-2 (FIG. 1) according to some embodiments. In particular, during the communication technique electronic devices 110-1 and/or 110-2 may optionally receive an updated PSK 510 from controller 120. Then, electronic device 110-1 attempts 512 to re-establish encrypted communication with electronic device 110-2 (which may be upstream of electronic device 110-1) in the mesh network using PSK 310 (FIG. 3) or updated PSK 510.

When attempt 512 to re-establish the encrypted communication with electronic device 110-2 fails, electronic device 110-1 re-establishes encrypted communication 514 with electronic device 110-2 in mesh network 112 using predefined PPSK 314 (FIG. 3) between electronic devices 110-1 and 110-2. Note that some of the operations in FIG. 5 (such as establishing encrypted communication 514) may involve multiple operations, such as handshaking between electronic devices 110-1 and 110-2.

In an exemplary embodiment, each node (or electronic device) in a wireless mesh network may possess a network key (i.e., a PSK) in order to authenticate and form a secure wireless connection to another wireless node. This allows these nodes to form a wireless mesh network that acts as a network backbone and that provides service to an intranet and/or the Internet.

An operator of the wireless mesh network may want to rekey the nodes (via either an online technique or an offline technique), and this may be performed on a regular basis. For example, the operator may want to rekey the nodes for security reasons. However, rekeying can lead to one or more wireless nodes becoming stranded as they fail to receive the updated PSK before the network switches from the previous PSK to the updated PSK. For example, a given node may not receive the updated PSK because of: a power failure, wireless interference, a hardware failure, rebooting of an electronic device, a hacker attack, etc. Typically, a stranded network node requires a site visit by a network operator to investigate and to attempt corrective action. This often leads to network downtime and increased operating costs. Note that the risk of a stranded network node increases as the size (and complexity) of a mesh network increases.

The previously described communication technique can address many of these scenarios. For example, one failure scenario involves a wireless node failing to receive a rekey update in time before losing its uplink connectivity. Consequently, this wireless node may become stranded simply because the mesh network has started using a new key. In terms of IEEE 802.11 terminology, the network key (i.e., the PSK) acts as a credential as well as a keying material. One characteristic of the problem is the reliance on central distribution of a single key.

Therefore, the communication technique supplements this approach with the concepts of local distribution and multiple keys. For example, there may be a mutual credential between any two nodes in the mesh network. And this mutual credential can be exchanged frequently.

In particular, suppose there are three nodes: A, B and Z. Nodes A and B may each have a wired connection to the network. Node Z may rely on wireless communication to connect to node A or B in order to reach the network backbone. Moreover, the entire wireless mesh network may use a centrally provisioned key K.

Thus, nodes A and B may connect using K. By forming this connection using K, and by optionally employing additional methods to increase the confidence of the trust relationship, nodes A and Z can mutually exchange a credential with each other. This credential (T) can be ephemeral in nature (e.g., it may be used to establish a secure connection on one occasion), or it may have an expiration date. Furthermore, the credential can be private (e.g., just between nodes A and Z. Alternatively, node A can share this information about node Z with node B.

From the point of view of node Z (the wireless mesh node), the communication technique establishes a network credential technique with two sets of credentials. In particular, these credentials include a key K that is centrally provisioned and that can be updated as needed (i.e., K=>K'K"K'"), and a credential T that is locally provisioned and that can be updated as needed, such as after a time interval has elapsed (i.e., T=>T'=>T"T'"). For example, when a credential T or a PPSK expires, one or more new random numbers may be exchanged by the nodes in a given pair of nodes. Alternatively, the credential T may be event provisioned, such as after a secure association based on key K between a pair of nodes. Note that both the key K and the credential T can employ a different update schedule.

With access to two or more keys (i.e., the PSK and the PPSK), node Z can afford to be temporarily out of synchronization with the current version of one of the keys (which can be K or T) and still retain its ability to connect back to node A. Similarly, node Z can use this approach to connect to node B when it is out of synchronization with the current version of K or T.

Therefore, in the communication technique there is more than one (offline) key to authenticate to the network. In particular, access points (e.g., the electronic devices or the nodes) can provide each other with a regularly updated local credential. The presence of such an additional credential can allow the distribution of the centrally managed network key to be more manageable, i.e., much less of an operational impediment.

In the case of IEEE 802.11, an online rekey can be implemented for a group key, but not for a unicast key. In order to rekey a unicast key, a client can issue an Extensible Authentication Protocol over Local Area Network (EAPoL) start frame to cause a security association reset. This may result in a unicast key rekey.

We now describe embodiments of the electronic device. FIG. 6 presents a block diagram illustrating an electronic device 600, such as one of electronic devices 110 in FIG. 1 (e.g., electronic device 110-1). This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620. (While FIG. 6 includes one or more antennas 620, in some embodiments electronic device 600 includes one or more nodes, such as one or more nodes 608, e.g., a pad, which can be coupled to one or more antennas 620. Thus, electronic device 600 may or may not include one or more antennas 620.) For example, networking subsystem 614 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) and/or in firmware in interface circuit 618. Alternatively or additionally, at least some of the operations in the communication technique may be implemented in a physical layer, such as hardware in interface circuit 618.

Moreover, while the preceding embodiments illustrated the use of the communication technique and methods 200 (FIG. 2) and 400 (FIG. 4) in electronic device 110-1 (FIG. 1), in other embodiments the remedial action is performed: system-wide, per radio, per wireless network, per client, etc. Thus, at least some of the operations in the communication technique and methods 200 (FIG. 2) and 400 (FIG. 4) may be performed by a remote electronic device or server. For example, the communication technique may be performed or coordinated system-wide (such as for multiple electronic devices) by a central server or by a controller.

In an alternative approach, in some embodiments controller 120 (FIG. 1) distributes a first PSK that is valid for a first time interval to electronic devices 110 (FIG. 1). Then, prior to the first time interval elapsing, controller 120 (FIG. 1) distributes a second PSK that is valid for a second time interval to electronic devices 110 (FIG. 1). In this way, the distribution of the second PSK overlaps the remainder of the first time interval, which may reduce the likelihood of an electronic device being stranded.

In the preceding description, we refer to 'some embodiments.' Note that 'some embodiments' describes a subset of all of the possible embodiments, but does not always specify the same subset of embodiments. Moreover, note that the numerical values provided are intended as illustrations of the communication technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with other electronic devices, wherein a path to a root electronic device in the other electronic devices, which is coupled to a network, contains at least one wireless connection that passes information from a client device to the network via an access point, wherein the electronic device is configured to:
receive a pre-shared key (PSK) from a controller;
establish encrypted communication with a first electronic device in the other electronic devices using the PSK;
exchange a first personal pre-shared key (PPSK) with the first electronic device, wherein the first PPSK is associated with the electronic device and the first electronic device, and wherein exchanging the first PPSK involves one of: providing at least a first portion of the first PPSK to the first electronic device, and receiving at least a second portion of the first PPSK to the first electronic device;

when a subsequent attempt to establish encrypted communication with the first electronic device using the PSK fails, establish encrypted communication with the first electronic device using the first PPSK; and when the subsequent attempt to establish encrypted communication with the first electronic device using the PSK succeeds, perform encrypted communication with the first electronic device using the PSK, wherein the electronic device is an arbitrary member of a group of electronic devices that includes the electronic device and the other electronic devices.

2. The electronic device of claim 1, wherein the encrypted communication includes Wi-Fi Protected Access.

3. The electronic device of claim 1, wherein the first PPSK includes one or more random numbers.

4. The electronic device of claim 1, wherein the first PPSK is valid during a time interval.

5. The electronic device of claim 1, wherein the electronic device is further configured to provide the first PPSK to a second electronic device in the other electronic devices.

6. The electronic device of claim 1, wherein the electronic device is further configured to:
establish encrypted communication with a second electronic device in the other electronic devices using the PSK; and
exchange a second PPSK with the second electronic device, wherein the second PPSK is associated with the electronic device and the second electronic device; and
wherein the electronic device is configured to establish encrypted communication with the second electronic device using the second PPSK when a subsequent attempt to establish encrypted communication with the second electronic device using the PSK fails.

7. The electronic device of claim 1, wherein the electronic device further comprises an antenna coupled to the interface circuit.

8. The electronic device of claim 1, wherein the electronic device further comprises:
a processor; and
a memory, coupled to the processor, which stores a program module configured to be executed by the processor, wherein, when executed by the processor, the program module causes the electronic device to perform:
the establishing; and
the exchanging.

9. A computer-program product for use in conjunction with an electronic device, the computer-program product comprising a non-transitory computer-readable storage medium and a program module embedded therein to exchange a personal pre-shared key (PPSK), wherein, when executed by the processor, the program module causes the electronic device to:
receive a pre-shared key (PSK) from a controller;
establish encrypted communication with a first electronic device in other electronic devices using the PSK, wherein a path to a root electronic device in the other electronic devices, which is coupled to a network, contains at least one wireless connection that passes information from a client device to the network via an access point;
exchange a first PPSK with the first electronic device, wherein the first PPSK is associated with the electronic device and the first electronic device, and wherein exchanging the first PPSK involves one of: providing at least a first portion of the first PPSK to the first electronic device, and receiving at least a second portion of the first PPSK to the first electronic device;
establish encrypted communication with the first electronic device using the first PPSK when a subsequent attempt to establish encrypted communication with the first electronic device using the PSK fails; and
perform encrypted communication with the first electronic device using the PSK when the subsequent attempt to establish encrypted communication with the first electronic device using the PSK succeeds, wherein the electronic device is an arbitrary member of a group of electronic devices that includes the electronic device and the other electronic devices.

10. The computer-program product of claim 9, wherein the first PPSK includes one or more random numbers.

11. The computer-program product of claim 9, wherein the first PPSK is valid during a time interval.

12. The computer-program product of claim 9, wherein, when executed by the electronic device, the program module causes the electronic device to:
establish encrypted communication with a second electronic device in the other electronic devices using the PSK;
exchange a second PPSK with the second electronic device, wherein the second PPSK is specific to the electronic device and the second electronic device; and
establish encrypted communication with the second electronic device using the second PPSK when a subsequent attempt to establish encrypted communication with the second electronic device using the PSK fails.

13. A method for exchanging a personal pre-shared key (PPSK) using an electronic device, wherein the method comprises:
receiving a pre-shared key (PSK);
establishing encrypted communication with a first electronic device in other electronic devices using the PSK, wherein a path to a root electronic device in the other electronic, which is coupled to a network, contains at least one wireless connection that passes information from a client device to the network via an access point;
exchanging a first PPSK with the first electronic device, wherein the first PPSK is associated with the electronic device and the first electronic device, and wherein exchanging the first PPSK involves one of: providing at least a first portion of the first PPSK to the first electronic device, and receiving at least a second portion of the first PPSK to the first electronic device;
when a subsequent attempt to establish encrypted communication with the first electronic device using the PSK fails, establishing encrypted communication with the first electronic device using the first PPSK; and
when the subsequent attempt to establish encrypted communication with the first electronic device using the PSK succeeds, performing encrypted communication with the first electronic device using the PSK, wherein the electronic device is an arbitrary member of a group of electronic devices that includes the electronic device and the other electronic devices.

14. The method of claim 13, wherein the encrypted communication includes Wi-Fi Protected Access.

15. The method of claim 13, wherein the first PPSK includes one or more random numbers.

16. The method of claim 13, wherein the first PPSK is valid during a time interval.

17. The method of claim 13, wherein the method further comprises providing the first PPSK to a second electronic device in the other electronic devices.

18. The method of claim 13, wherein the method further comprises:
- establishing encrypted communication with a second electronic device in the other electronic devices using the PSK;
- exchanging a second PPSK with the second electronic device, wherein the second PPSK is associated with the electronic device and the second electronic device; and
- establishing encrypted communication with the second electronic device using the second PPSK when a subsequent attempt to establish encrypted communication with the second electronic device using the PSK fails.

\* \* \* \* \*